(12) United States Patent
Aoki

(10) Patent No.: US 6,272,589 B1
(45) Date of Patent: Aug. 7, 2001

(54) METHOD AND APPARATUS FOR CONTROLLING WRITE BUFFERING OPERATION IN A DISK DRIVE

(75) Inventor: Shoichi Aoki, Tokyo (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 0 days.

(21) Appl. No.: 09/237,683

(22) Filed: Jan. 27, 1999

(30) Foreign Application Priority Data

Mar. 20, 1998 (JP) .................................................. 10-072306

(51) Int. Cl.$^7$ .................................................. G06F 12/00
(52) U.S. Cl. ............................................... 711/112; 710/56
(58) Field of Search ..................................... 711/112, 113; 710/52, 56; 709/232; 395/872

(56) References Cited

U.S. PATENT DOCUMENTS 5,758,191 * 5/1998 Kasebayashi et al. .................. 710/56
6,101,329 * 8/2000 Graef ..................................... 395/872
6,105,070 * 8/2000 Gaylord ................................. 709/232

FOREIGN PATENT DOCUMENTS 2-83613    3/1990  (JP).
5-81165    4/1993  (JP).
8-212015   8/1996  (JP).

* cited by examiner

Primary Examiner—Hiep T. Nguyen
Assistant Examiner—Nasser Moazzami
(74) Attorney, Agent, or Firm—Pillsbury Winthrop LLP

(57) ABSTRACT

A disk drive having a buffer memory for storing write data transferred from a host system. The disk drive comprises a CPU and incorporates a disk. In the disk drive, the write data stored in the write buffer area of the buffer memory is written on the disk. The CPU monitors the amount of data accumulated in the write buffer area, while the data is being written on the disk. If the amount of data accumulated in the write buffer area is decreasing, the CPU determines the rate at which the data amount is decreasing. In accordance with the rate determined, the CPU changes the storage size of the write buffer area to a new size. This prevents the write buffer area from becoming empty while data is being read from the write buffer area and being written on the disk, even if the data is transferred from the host system to the disk drive more slowly than the data is transferred from the write buffer area to the disk.

4 Claims, 4 Drawing Sheets

METHOD AND APPARATUS FOR CONTROLLING WRITE BUFFERING OPERATION IN A DISK DRIVE

BACKGROUND OF THE INVENTION

The present invention relates to, for example, a hard disk drive, and more particularly to a disk controller for controlling write buffering.

A hard disk drive (HDD) is connected to a host system such as a computer system or the like and then used as a data storage device. The HDD receives data transferred from the host system and records the data (write data) on a disk, or data recording medium. The HDD reads data from the disk and transfers the data (read data) to the host system. The speed of data transfer between the host system and the HDD (host data transfer) is different from the speed of data transfer in the HDD, namely to and from the disk (disk data transfer). To compensate for the difference between these speeds, the HDD incorporates a buffer memory (RAM).

The buffer memory has a read buffer area and a write buffer area. The read buffer area is provided for temporarily storing data read from the disk. The write buffer areas is provided for temporarily storing data to be written on the disk. The ratio in size between the read and write buffer areas depends on the design specification of the buffer memory. In most cases, the read buffer area is larger than the write buffer area.

Upon receipt of a write command from the host system, the HDD receives write data transferred from the host system. In the HDD, the write data is temporarily stored in the write buffer area of the buffer memory. Meanwhile, the magnetic head for reading data on the disk and writing data therefrom is moved to prescribed position (a target access track) on the disk that is spinning at high speed. The magnetic head is thus prepared to write data on the disk. The write data is read from the write buffer area of the buffer memory, in units sectors. Then, the magnetic head writes data sequentially in those of the sectors provided on the disk which have been designated, first in the first of the designated sectors.

The speed of host data transfer depends on the performance (data-processing ability) of the host system. Hence, the speed of data transfer between one host system and an HDD differs from the speed of data transfer between another host system and an HDD of the same performance.

The speed of host data transfer may be higher than the speed of disk data transfer (i.e., the speed of recording data on the disk). In this case, data is written in the write buffer area faster than data is read from the read buffer area in the buffer memory. The write buffer area will become full more quickly than the read buffer area. Once the write buffer area becomes full, the HDD stops the host data transfer until the write buffer area becomes empty in part. The HDD starts the host data transfer again when some write data is read from the write buffer area, rendering the area partly empty.

Conversely, the speed of host data transfer may be lower than the speed of disk data transfer. If this is the case, the write buffer area of the buffer memory will become empty more quickly than the read buffer area. The write buffer area becomes empty when all write data is read from the buffer memory and written on the disk. Once the write buffer area becomes empty, the HDD starts waiting for any write data that will be transferred from the host system. As soon as write data (data for at least one sector of the disk) is transferred from the host system to the write buffer area, the HDD starts writing the data on the disk.

Recently it is observed that the drive data transfer is faster than the host data transfer in many cases because it takes much time to process write data in the host system and to transfer the data to the HDD. Hence, there is the trend that the write buffer area becomes empty more quickly than the read buffer area. When the write buffer area of the buffer memory becomes empty, the starts waiting for any write data that will be transferred from the host system. The moment write data is transferred from the host system to the write buffer area, the HDD starts writing the data on the disk.

When the HDD stops writing data on the disk, the head moves past the sector in which data is to be written. The HDD can no longer write data on the disk until the disk rotates further once to bring the sector to the head. It is desired that the HDD write data in the designated sector and some following sectors in the same track which has been designated. In other words, the HDD should write data in a plurality of consecutive sectors of a designated track for the time T (e.g., 15 ms) which the disk needs to rotate once.

BRIEF SUMMARY OF THE INVENTION

An object of the present invention is make a disk drive write data efficiently on a disk without waiting until the disk rotates once, by using a buffer memory having a write buffer area of an appropriate size, even if data is transferred between the disk drive and a host system at a relatively low speed. Another object of the invention is to prevent a buffer memory from having an empty part by minimizing the write buffer area of the buffer memory in accordance with the speed of transferring write data from a host system, thereby to enhance the use efficiency of the buffer memory.

In order to attain the objects the invention provides a disk drive having a disk on which write data transferred from a host system is recorded in accordance with a write command supplied from the host system. The disk drive comprises: a buffer storage having a write buffer area for temporarily storing the write data transferred from the host system; a disk controller for reading the write data from the write buffer area and writing the write data on the disk; monitoring means for monitoring a change in an amount of data accumulated in the write buffer area; and control means for changing the storage size of the write buffer area to a new storage size in accordance with the change monitored by the monitoring means.

The monitoring means monitors the change in the amount of data accumulated in the write data area. If the speed of host data transfer is low, the storage size of the write buffer area is changed, preventing the write buffer area from becoming empty. Since the write buffer area never becomes empty, the writing of the data onto the disk is not interrupted at all. In other words, the disk drive can write data efficiently on the disk, without waiting until the disk rotates once.

Moreover, a decrease in the amount of data accumulated in the write buffer area which may occur during the time the disk requires to rotate once can be predicted by monitoring the change in the amount of data. The storage size of the write buffer area can be changed to a minimum storage size which corresponds to the decrease predicted. This helps to use the buffer memory with the highest possible efficiency.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

An embodiment of the present invention will be described with reference to the accompanying drawings.
(Disk Drive)

Figure 2:
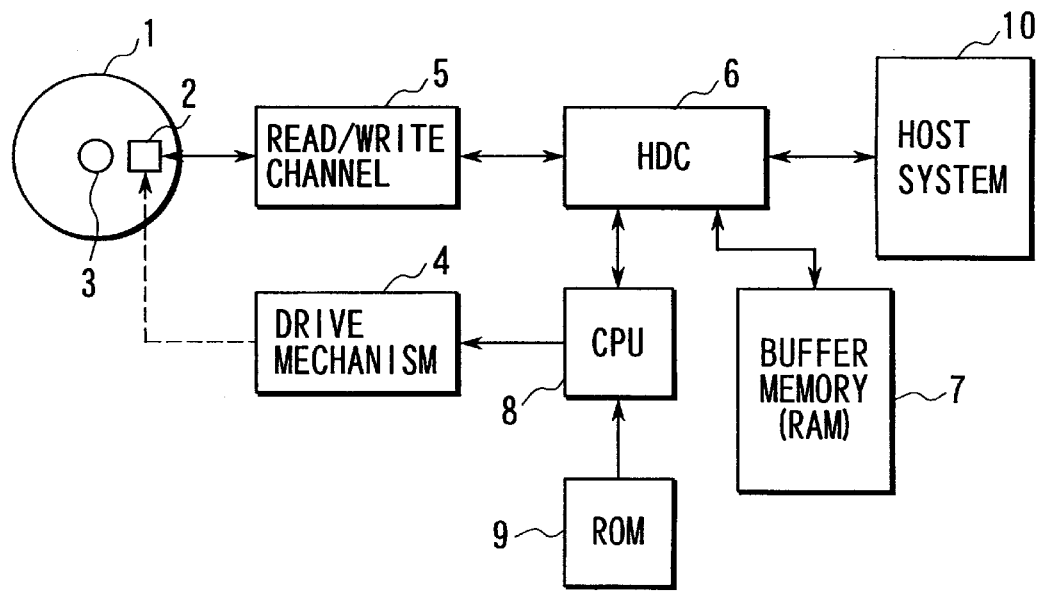
FIG. 2 is a block diagram showing the major components of the disk drive.

A disk drive according to the present invention is a hard disk drive (HDD) shown in FIG. 2. The HDD comprises a disk 1 used as a data storage medium, and a head 2 designed to read and write from and on the disk 1. The disk 1 is secured to a spindle motor 3, which rotates the disk 1 at high speed. The head 2 is moved in the radial direction of the disk 1 when driven by a drive mechanism 4. The drive mechanism 4 comprises a head actuator, a voice coil motor, and the like.

The HDD further comprises a read/write channel (read/write circuit) 5, a hard disk controller (HDC) 6, a buffer memory (RAM) 7, a microprocessor (CPU) 8, and a read-only memory (ROM) 9. The read/write channel 5 converts write data transferred from the HDC 6, into a write signal. The write signal is supplied to the head 2. The read/write channel 5 also converts a read signal read from the disk 1 by the head 2, into read data. The read data is supplied to the HDC 6, too. The HDC 6 uses the buffer memory 7, thereby transferring data between the HDD and a host system 10 and between the disk 1 and the buffer memory 7, under the control of the CPU 8. The CPU 8 is the main controller (also known as "mirocontoller") in the HDD. The CPU 8 executes the control program stored in the ROM 9 (including a supervisor program, to be describe later) to perform various controls.

The host system 10 is, for example, a personal computer. The host system 10 generates a write command including write data. The write command is supplied to the HDC 6.
(HDC and Buffer Memory)

Figure 1:
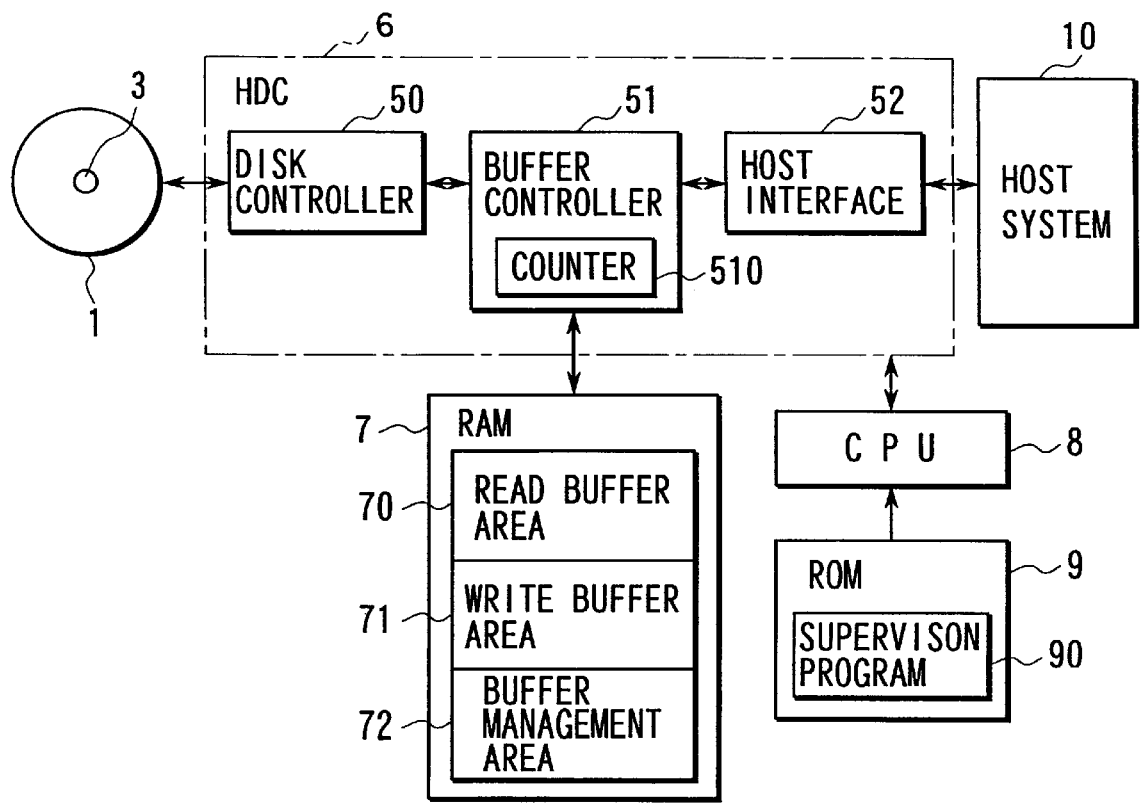
FIG. 1 is a block diagram showing the major components of the hard disk controller incorporated in a disk drive according to the invention.

As shown in FIG. 1, the HDC 6 has a disk controller 50, a buffer controller 51, and a host interface 52. The buffer controller 51 performs access control (i.e., data input/output control) on the buffer memory 7. The buffer controller 51 has a counter 510. The counter 510 counts sectors of write data stored in the write buffer area 71 of the memory 7. (In other words, the counter 510 determines the mount of data accumulated in the write buffer area 71.) The count of the counter 510 has an increment every time one-sector data transferred from the host system 10 is written into the write buffer area 71 of the memory 7. The count has one decrement every time one-sector data read from the area 71 is written on the disk 1.

The host interface 52 is an interface controller for controlling the transfer of read data, write data and various commands between the buffer controller 51 and the host system 10 (e.g., a personal computer). The disk controller 50 controls the transfer of data between the disk 1 and the buffer memory 7. The controller 50 can operates in disk read mode and disk write mode. In the disk read mode, the controller 50 transfers read data requested by the host system 10, to the buffer memory 7 via the buffer controller 51, said read data having been read from the disk 1 by the head 2 and reproduced by the read/write channel 5. In the disk write mode, the controller 50 transfers write data requested by the host system 10, from the buffer memory 7 to the disk 1 via the buffer controller 51. The write data is processed by the read/write channel 5 and then written on the disk 1 by the head 2.

As shown in FIG. 1, the buffer memory 7 has a read buffer area 70 and, as indicated above, the write buffer area 71. The buffer areas 70 and 71 are provided for temporarily storing the read data and the write data respectively. In the present embodiment, the buffer areas 70 and 71 each have a variable storage size (i.e., storage capacity defined by the number of sectors). Namely, the storage sizes of the buffer areas 70 and 71 are not fixed; they can change from their respective initial values. The buffer memory 7 further has a buffer management area 72. Stored in this area 72 is size data that represents the storage sizes of the buffer areas 70 and 71. The memory 7 has another area (not shown) in which data is stored for managing defects sectors, if any, existing on the disk 1.

As described above, the buffer controller 51 performs access control on the buffer memory 7. Furthermore, the controller 51 manages the data stored in the buffer memory 7 and manages both buffer areas 70 and 71. The management the controller 51 achieves includes the process of resetting the storage size of the write buffer area 71 to prevent the area 71 from becoming empty during the data-writing operation.

As mentioned above, the CPU 8 executes the control program stored in the ROM 9 (including a supervisor program 90), thus performing the main control of the HDD. More specifically, the CPU 8 controls the drive mechanism 4, which moves the head 2 to a target track on the disk 1; the CPU 8 accomplishes seek control. The CPU 8 executes the supervisor program 90, monitoring the buffer memory 7 to determine changes in the amount of data stored in the write buffer area 71. Upon determining that the amount of data stored in the area 71 is decreasing, the CPU 8 calculates a new storage size (i.e., the minimum storage capacity required) for the write buffer area 71.
(Data-Writing Operation)

Figure 3:
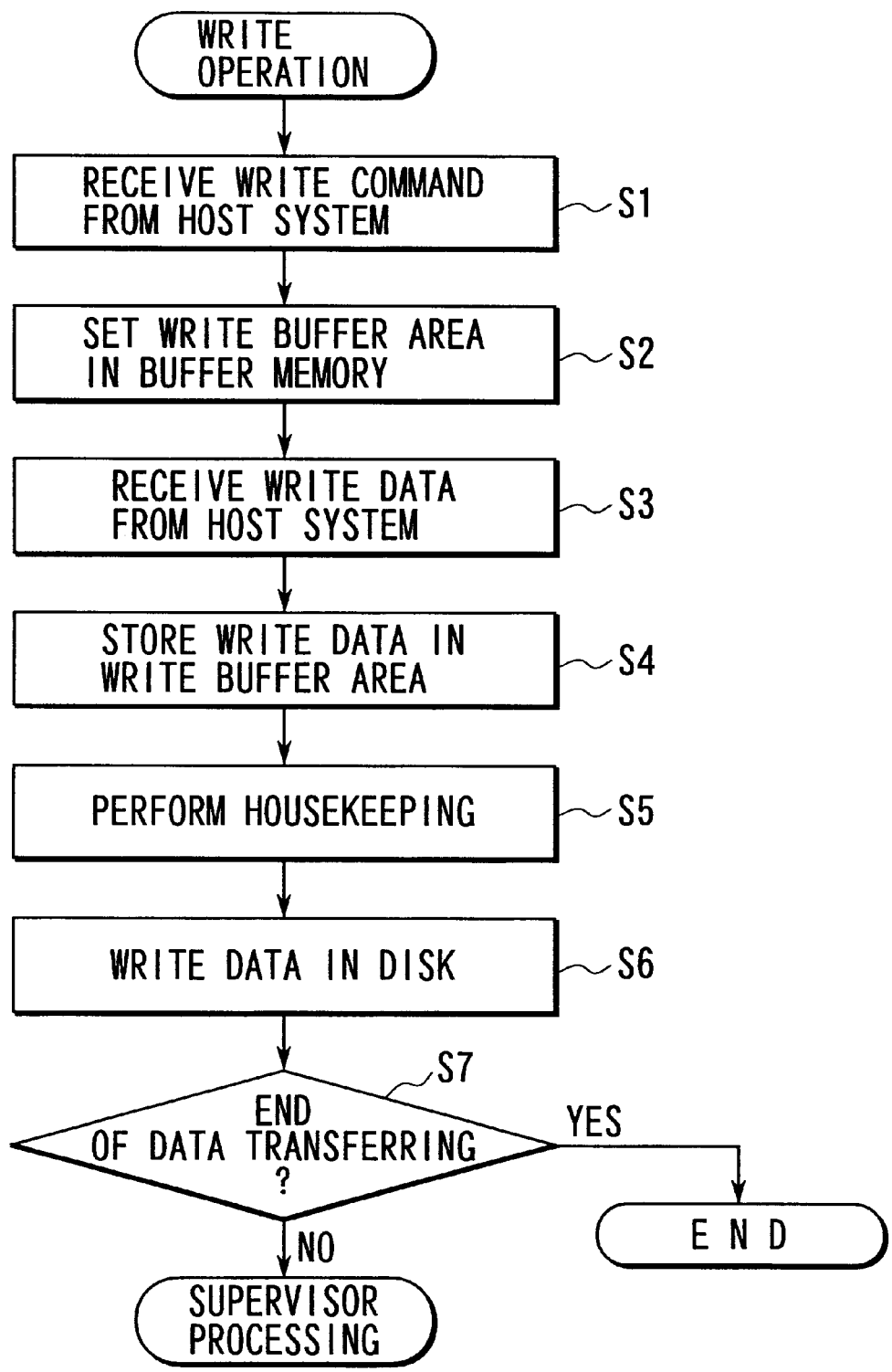
FIG. 3 is a flow chart explaining how the disk drive operates to write data on a disk.

How the HDD writes data on the disk 1 will be explained, with reference to the flow chart of FIG. 3.

When the host system 10 issues a write command to the HDD. In the HDC 6, the host interface 52 receives the write command (Step S1). The CPU 8 receives the write command from the host interface 52 and decodes and recognizes the write command.

Upon receipt of a write command, the CPU 8 causes the buffer controller 51 to set a write buffer area 71 in the buffer memory 7 (Step S2). The write buffer area 71 thus set has an initial size represented by the data stored in the buffer management area 72 of the buffer memory 7. This data has been loaded from the ROM 9 at the power-on of the HDD.

The showing the initial size for the write buffer area 71 may be stored any nonvolatile memory other than the ROM 9, such as an EEPROM (Electrically Erasable and Programmable Read Only Memory).

After receiving the write command, the host interface 52 starts receiving the write data transferred from the host system 10 (Step S3). The buffer controller 51 receives the write data from the host interface 52 and writes the write data in the write data, in units of sectors, in the write buffer area 71 of the buffer memory 7 (Step S4). The count of the counter (register) 510 incorporated in the buffer controller 51 has one increment every time one sector of write data is written in the write buffer area 71. Thus, the count increases to "5" when five sectors of write data are accumulated in the write buffer area 71.

Meanwhile, the CPU 8, which has recognized the write command, perform housekeeping to write the data in a designated area of the disk 1 (Step S5). More precisely, the CPU 8 calculates the physical position of the first of the sectors that form the designated area (track) of the disk 1, and supplies the data representing the physical position and the number of sectors to the disk controller 50. Further, the CPU 8 performs seek control, moving the head 2 to the physical position (target position).

While the CPU 8 is performing the housekeeping, the transfer of write data from the host system 10 to the host interface 52 (i.e., host data transfer) continues. Unless the host data transfer is very slow, the write buffer area 71 becomes full before the head 2 starts writing data on the disk 1 if it is too small to store all write data.

When the CPU 8 finishes performing housekeeping, the disk controller 50 acquires the write data from the write buffer area 71 of the buffer memory 7 through the buffer controller 51 in order to write the data on the disk 1 (Step S6). That is, the disk controller 50 transfers the write data read from the write buffer area 71, to the read/write channel 5. The head 2, which is located at the physical position of the first sector designated, starts writing the data in the sectors designated, as it receives write signals supplied from the read/write channel 5.

(Supervisor Operation on the Buffer Memory)

As described above, the count of the counter 510 provided in the buffer controller 51 has one decrement every time one-sector data read from the write buffer area 71 is written on the disk 1. The counter 510 output a count value which represents the amount of data stored in the write buffer area 71 (i.e., the amount of data yet to be written on the disk 1.

Figure 4:
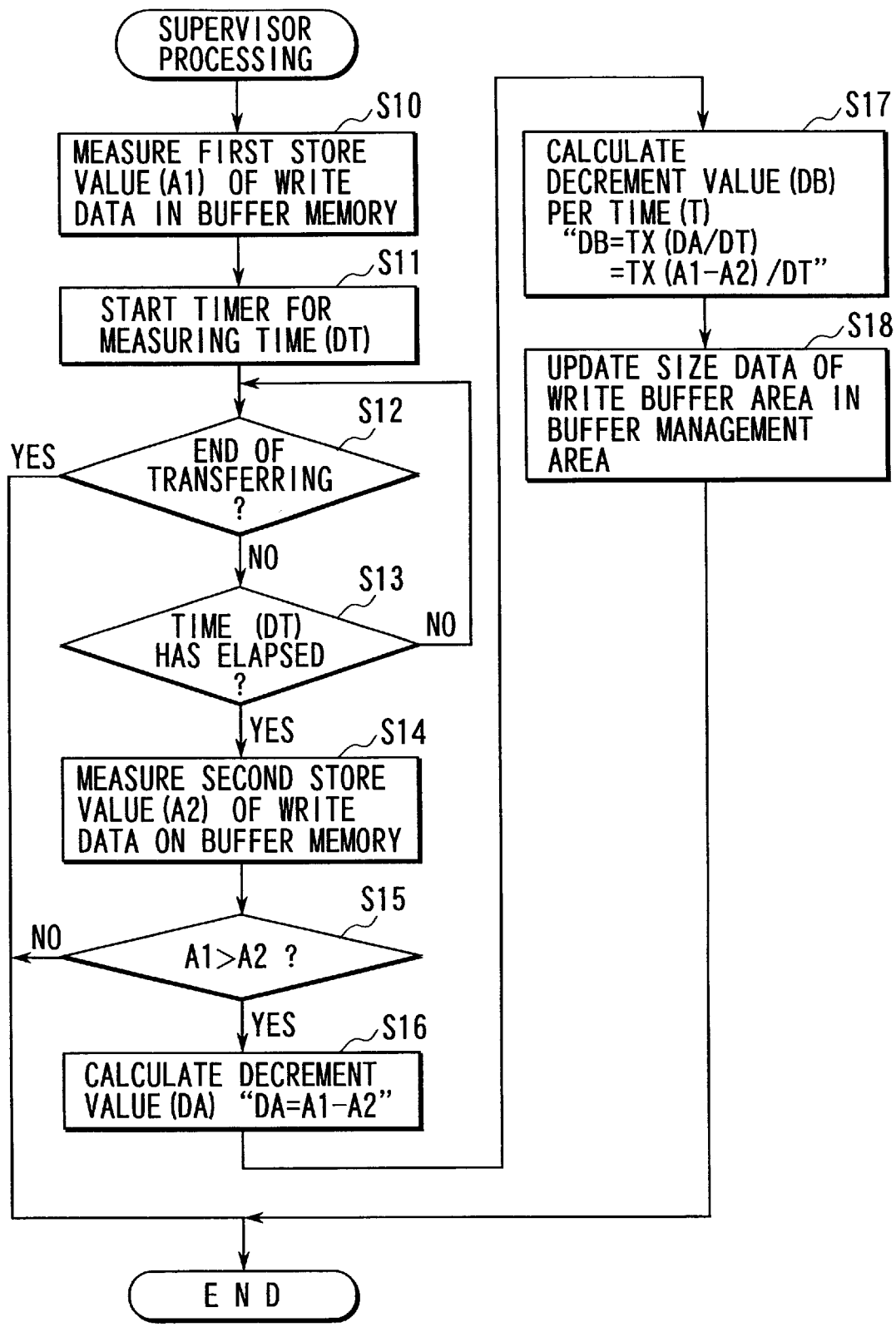
FIG. 4 is a flow chart explaining how the write buffer area of the buffer memory provided in the disk drive is monitored.

When the disk controller 50 makes the head 2 start writing data on the disk 1, the CPU 8 determines whether or not all write data transferred from the host system 10 has passed through the host interface 51 (Step S7). If all write data has not passed through the host interface 51, the CPU 8 will perform supervisor processing, as will be explained below with reference to the flow chart of FIG. 4.

First, the CPU 8 reads the count of the counter 510, thereby measuring the first store value A1, or the number of sectors of write data stored in the write buffer area 71 (Step S10). Next, the CPU 8 activate a timer (internal timer), which measures a prescribed monitoring interval (sampling time) DT (Step S11).

When the CPU 8 determines that the monitoring interval DT has lapsed before all write data supplied from the host system 10 passes through the host interface 51, it reads the count value, thereby measuring the second store value A2, or the number of sectors of write data now stored in the write buffer area 71 (Steps S12, S13 and S14).

Upon measuring the second store value A2, the CPU 8 compares the count values A1 and A2 measured at monitoring intervals DT, thereby determining whether the sectors of data stored in the write buffer area 71 are increasing or decreasing in numbers (Step S15). In other words, the CPU 8 starts monitoring the amount of write data stored in the write buffer area 71 at the intervals DT, when the operation of writing data on the disk 1 is started in accordance with the write command supplied from the host system 10. This supervisor processing proceeds along with the operation of writing data on the disk 1 and the transfer of the write data from the host system 10. The supervisor processing is not carried out if it is determined in Step S12 that all write data transferred from the host system 10 has passed through the host interface 51.

In Step S15, it is determined whether the first count value A1 is greater than the second count value A2. If A1≦A2, that is, if the amount of write data stored in the area 71 remains the same or is increasing, the CPU 8 stops the supervisor processing. In this case, data is transferred from the host system 10 to the HDD at a higher speed than data is transferred from the buffer memory 7 to the disk 1. (Namely, the host data transfer speed is higher than the disk data transfer speed.) Hence, the write buffer area 71 of the buffer memory 7 would not become empty before all write data is transferred from the host system 10 to the HDD. The CPU 8 can make, without doing anything particular, th e HDC 6 write data on the disk 1 continuously.

If Yes in Step S15, that is, if A1>A2, it is determined the amount of write data stored in the area 71 is decreasing. In this case, the host data transfer speed is lower than the disk data transfer speed. The write buffer area 7 will probably become empty before all write data is transferred from the host system to the HDD if the size of the write buffer area 71 remains the same (or remains at the initial size). If the write buffer area 71 becomes empty before the completion of data transfer from the host system 10 to the HDD, the operation of writing data on the disk 1 must be stopped temporarily until at least one sector of data is transferred from the host system 10 to the buffer area 71. If this happens, the HDD needs to wait until the disk 1 rotates once, before starting the operation of writing data on the disk 1.

In the case where the results of the supervisor processing show that the host data transfer speed is lower than the disk data transfer speed, the CPU 8 operates (Steps S16 to S18) to prevent the write buffer area 71 from becoming empty before the completion of data transfer from the host system 10. How the CPU 8 operates for this purpose will be described, with reference to FIG. 4.

First, the CPU 8 finds the difference between the first count value A1 and the second count value A2. More precisely, the CPU 8 calculates the decrease DA(A1−A2) in the number of sectors of data stored in the write buffer area 71, which has occurred during the monitoring interval DT (Step S16). The decrease DA means the difference between the number of empty sectors existing on the disk 1 and the number of sectors of data transmitted to the buffer memory 7 from the host system 10.

Next, the CPU 8 calculates a decrease DB in the number of sector of data stored in the area 71, which has occurred in the last period T equal to the time the disk 1 requires to rotate one time. More correctly, the CPU 8 effects the following calculation to obtain the decrease DB (Step S17):

$$DB = T \times DA/DT$$

where DT is the monitoring interval and DA is the decrease in the number of sectors of data stored in the area 71.

DA/DT in the above equation, i.e., (A1−A2)/DT, is the rate at which the number of sectors of data stored in the write buffer area 71 decreases. Thus, DB (=T×DA/DT) is the difference between the number of sectors of data that can be written on the disk 1 during the period T and the number of sectors of data that are transferred to the buffer memory 7 from the host system 10.

The CPU 8 updates the size data stored in the buffer management area 72 of the buffer memory 7 to the decrease DB in the number of sector of data stored in the area 71, when it executes the next write command supplied from the host system 10 (Step S18). In other words, the CPU 8 changes the size data representing the size initially set for the write buffer area 71, to a new size data which represents the decrease DB. The HDC 5 writes data on the disk 1 in response to the next write command, by using the write buffer area 71 which has the size newly set.

In Step S2, the buffer controller 51 sets the latest size DB (=T×DA/DT) for the write buffer area 71 on the basis of the size data updated in the buffer management area 72. This prevents the write buffer area 71 from becoming empty before all data is transmitted from the host system, while the data is being transferred from the area 71 to the disk 1. The write buffer area 71 would not become empty while the data is being written on the disk 1. Thus, the HDD can write data efficiently on the disk 1, without waiting until the disk rotates once.

The size data stored in the buffer management area 72 is erased at the power-off of the HDD. Thereafter the power switch of the HDD may thereafter be closes. Then, the initial size data is stored into the buffer management area 72 when the CPU 8 receives the first write command after the power-on of the HDD. Consequently, the write buffer area 71 may become empty again, and the HDD may not write data until the disk rotates once.

In view of this possibility, it is desirable to store any updated size data of the write buffer area 71 in nonvolatile memory means such as an EEPROM or a special area (generally called "system area") of the disk 1, in which data cannot be rewritten by the user. Once stored in the nonvolatile memory means, the updated size data can be loaded into the buffer management area 72 at the power-on of the HDD.

The advantages of the HDD will be described in detail with reference to FIG. 5.

Assume that each track on the disk 1 consists of N sectors. Then, the HDD can write N sectors 101 of data for the time T which the disk 1 requires to rotate once. If N=100 as shown in FIG. 5, the HDD reads 100 sectors 101 of data while the disk 1 is rotating through 360°. If the write buffer area 71 of the buffer memory 7 has a storage size of Na sectors of data, Na sectors of the data transferred from the host system 10 are accumulated in the write buffer area 71 while the magnetic head 2 is being prepared to write data on the disk 1. When the head 2 is made ready to write data, the disk controller 50 causes the head 2 to start writing data on the disk 1 as has been mentioned above.

Figure 5:
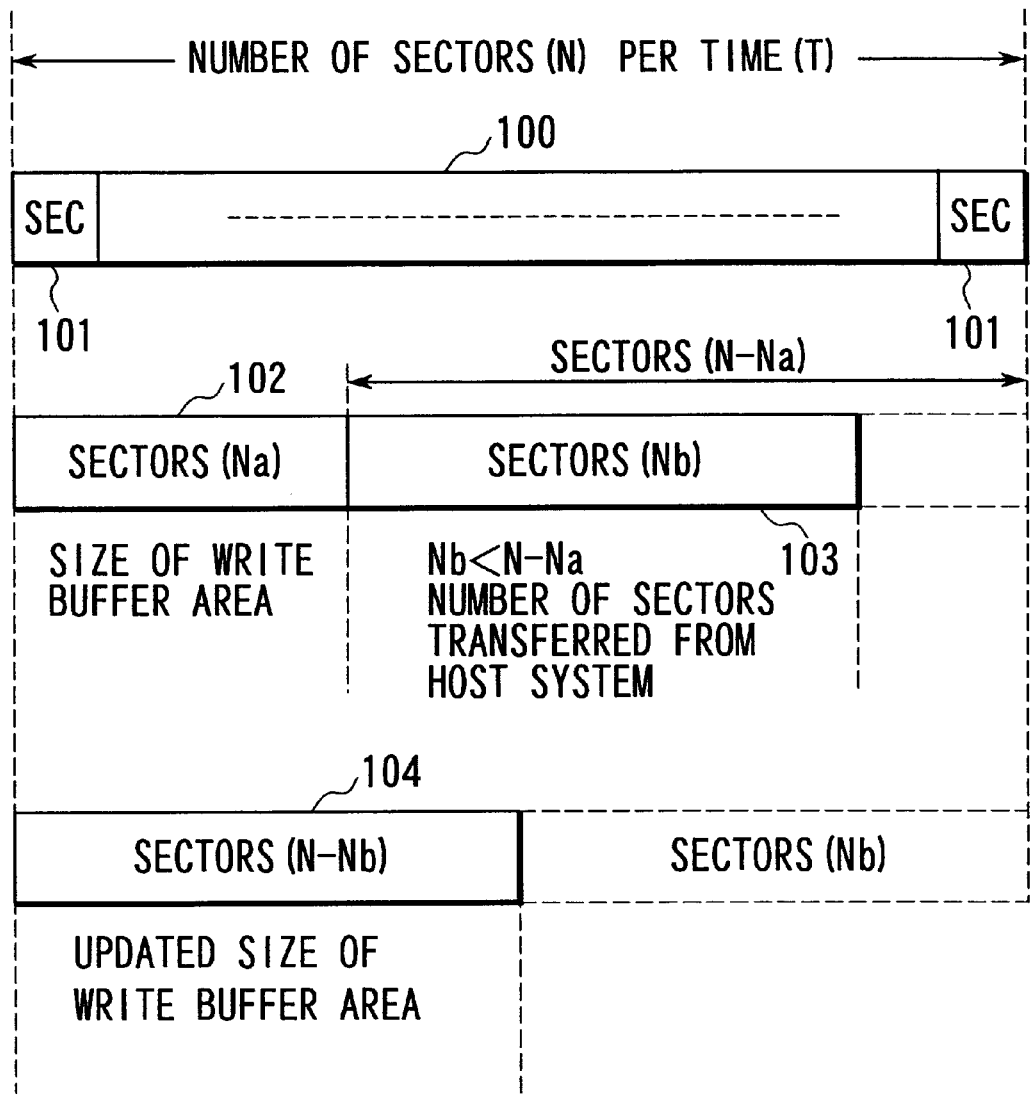
FIG. 5 is a schematic view explaining the resetting of the write buffer area of the buffer memory provided in the disk drive.

Assume that an amount Nb of data (Nb sectors of data) is transferred for the time T from the host system 10 to the host interface 52 as is illustrated in FIG. 5. If Nb is less than (N−Na), that is, if Nb<N−Na, the write buffer area 71 will be very likely to become empty. This results in a temporal stop of the writing of data onto the disk 1, causing the HDD to wait until the disk 1 rotates one time. As a consequence, the HDD needs twice the time T (i.e., the time the disk 1 requires to rotates once) to write N sectors of data transferred from the host system 10 though it can write the same amount of data within time T (i.e., the time the disk 1 requires to rotate once).

In other words, the HDD need not wait until the disk 1 rotates once if Nb+Na is equal to or greater than N as can be seen from FIG. 5. Here, Nb is the number of the sectors of data transferred for the time T from the host system 10, and Na is the number of the sectors of data defining the storage size of the write buffer area 71. Hence, the number of sectors of data accumulated in the write buffer area 71 is monitored in the HDD to determine whether the data stored in the area 71 is increasing or decreasing. If the data is decreasing, the rate of the decrease is calculated by monitoring the amount of data accumulated in the area 71 at least twice.

Assume that the amount of data accumulated in the area 71 is monitored twice at monitoring interval DT and that A1 sectors of data and A2 sectors of data are found in the area 71 at the first monitoring and the second monitoring, respectively. If A1>A2, the amount of data stored in the area 71 is decreasing. The rate of decrease is DA/DT, or (A1−A2)/DT. Here, DA is the decrease DA in the amount of data that has occurred during one rotation of the disk 1. The storage size of the write buffer area 71 is changed in accordance with the rate DA/DT, thereby preventing the area 71 from becoming empty until N sectors of data are written on the disk 1 for the time T.

The minimum storage size that the area 71 may have not to become empty equals the decease N−Nb in the amount of write data, which has occurred during the period T. N−Nb is the decrease DA (=A1−A2) that has taken place during the last monitoring interval DT. The decrease N−Nb is obtained as follows:

$$N-Nb=T\times(DA/DT)=T\times(A1-A2)/DT$$

Hence, once the storage size of the write buffer area 71 is set to at lest N−Nb, the area 71 will not become empty before all data to be written on the disk 1 is transferred from the host system 10 even if the number Nb of sectors of data transferred for the time T from the system 10 is less than N−Na. The HDD can therefore write data on the disk 1, without waiting until the disk 1 rotates once.

As has been described, the amount of data accumulated in the write buffer area 71 having the initially set storage size while data transferred from the host system 10 is being written on the disk 1 in accordance with the write command supplied from the host system 10. If the amount of data is decreasing, the rate at which the amount of data is decreasing is calculated. The storage size of the area 71 is changed on the basis of the rate calculated. This prevents the write buffer area 71 from becoming empty while data is being read from the area 71 and written onto the disk 1. Since the changes in the amount of data accumulated in the area 71 is monitored, it is possible to detect which speed is higher, the speed of transferring data from the host system 10 to the HDD (the speed of host data transfer) or the speed of transferring data from the buffer memory 7 to the disk 1 (the sped of disk data transfer).

The embodiment described above is an HDD. Nonetheless, the present invention can be applied to any disk drive, such as an optical disk drive, that receives data transferred from a host system and writes the data on a disk in response to a write command supplied from the host system. The invention can be applied to an HDD in which the CPU first receives the information about the speed of transferring data from a host system to the HDD and then sets an initial storage size for the write buffer area in accordance with the information. Further, the initial storage size may be changed to a value which is not so small and which prevent the write buffer area from becoming empty for the time T which the disk requires to rotate once.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A disk drive comprising:
host interface for receiving and transmitting commands and data from and to a host system;
a disk for recording write data transferred from the host system, in response to a write command supplied from the host system;
buffer storage having a write buffer area for temporarily storing the write data transferred from the host system to said host interface;
disk controller for reading the write data from the write buffer area and writing the write data on said disk;
a monitor for monitoring a change in an amount of accumulated in the write buffer area; and
a controller for changing the storage size of the write buffer area to a new storage size in accordance with the change monitored by said monitor;
wherein said monitor calculates a decrease (DA) in the amount of data accumulated in the write buffer area which occurs during a predetermined monitoring time (DT) when said monitor detects that the amount of data is increasing, and further calculates a decrease (DB) in the amount of data accumulated in the write buffer area which occurs during a time (T) the disk requires to rotate once, in accordance with the following equation:

$$DB=T \times DA/DT,$$

and
said controller sets a minimum storage size corresponding to the decrease (DB) as a new storage size of the write buffer area.

2. A disk drive comprising:
host interface for receiving and transmitting commands and data from and to a host system;
a disk for recording write data transferred from the host system, in response to a write command supplied from the host system;
buffer storage device having a write buffer area for temporarily storing the write data transferred from the host system to said host interface;
disk controller for reading the write data from the write buffer area and writing the write data on said disk;
a monitor for monitoring a change in an amount of accumulated in the write buffer area; and
a controller for changing the storage size of the write buffer area to a new storage size in accordance with the change monitored by said monitor;
wherein said monitor calculates a first amount of write data accumulated in the write buffer area after said disk controller starts reading the write data accumulated in the write buffer area and writing the write data onto said disk, calculates a second amount of write data accumulated in the write buffer area after a predetermined monitoring time (DT) has elapsed, and calculates a decrease (DA) in the data accumulated in the write buffer area which occurs during the monitoring time (DT), from a difference between the first and second amounts of write data, and said controller sets a minimum storage size as a new storage size of the write buffer area, said minimum storage size corresponding to a decrease (DB) in the amount of data accumulated in the write buffer area which is obtained from the decrease (DA) and which occurs during a time (T) the disk requires to rotate once.

3. A disk drive comprising:
host interface for receiving and transmitting commands and data from and to a host system;
a disk medium for recording write data transferred from the host system;
buffer storage device having a write buffer area for temporarily storing the write data transferred from the host system to said host interface;
buffer controller for controlling data-access to said buffer storage device and managing the write buffer area;
disk controller for transferring the write data read from the write buffer area by said buffer controller to s aid disk medium; and
a CPU for controlling a data-writing operation in response to a write command supplied from the host system, calculating a storage size that the write buffer area needs in order to be managed appropriately, on the basis of a change in an amount of write data accumulated in the write buffer area, and setting the storage size in said buffer controller;
wherein said buffer controller comprises:
a counter for counting the write data transferred to said buffer storage device, in units of sectors; and
a monitor for subtracting the number of any sectors of data transferred from said buffer storage device to said disk medium, from a count value of the counter, thereby to determine the number of the sectors of write data which are stored in the write buffer area; and
wherein said CPU executes a predetermined supervisor program, thereby to monitor a decrease (DA) in the amount of write data accumulated in the write buffer area, on the basis of a number of sectors of data which has been measured by said buffer controller, calculates from the decrease (DA) a decrease (DB) in the amount of write data which occurs during a time (T) said disk medium requires to rotate once, in accordance with the following equation:

$$DB=T \times DA/DT,$$

and
sets a minimum storage size corresponding to the decrease (DB) as a new storage size of the write buffer area.

4. A method of controlling a buffer storage incorporated in a disk drive and having a write buffer area for storing write data transferred from a host system to a disk medium provided in the disk drive, said method comprising:
receiving the write data transferred from the host system;
temporarily storing the write data in the write buffer area having an initial storage size;
reading the write data from the write buffer area in units of sectors and transferring the write data to the disk medium;

monitoring a decrease in the amount of write data stored in the write buffer area, at predetermined intervals while the write data is being written in and read from the write data area;

calculating a decrease in the amount of write data which occurs during a time which the disk medium requires to rotate once, on the basis of the decrease monitored; and setting a minimum storage size as a new storage size of the write buffer area, said minimum storage size corresponding to the decrease thus calculated;

wherein said calculating a decrease comprises:

monitoring a decrease (DA) in terms of a number of sectors of data stored in the write buffer area, at predetermined intervals (DT); and calculating from the decrease (DA) a decrease (DB) in the amount of write data which occurs during a time (T) said disk medium requires to rotate once, in accordance with the following equation:

$DB = T \times DA/DT.$

* * * * *